United States Patent [19]

Utsumi et al.

[11] Patent Number: 4,889,746

[45] Date of Patent: Dec. 26, 1989

[54] PROCESS FOR MANUFACTURING AN OPTICAL RECORDING MEDIUM

[75] Inventors: Kenichi Utsumi, Zama; Tetsuya Yuasa; Yasuyuki Goto, both of Atsugi; Iwao Tsugawa, Machida; Nagaaki Koshino, Yokohama, all of Japan

[73] Assignee: Fujitsu Limited, Kawasaki, Japan

[21] Appl. No.: 182,713

[22] Filed: Apr. 18, 1988

[30] Foreign Application Priority Data

Apr. 18, 1987 [JP] Japan .................................. 62-094296

[51] Int. Cl.⁴ ............................................. B05D 5/06
[52] U.S. Cl. .................................. 427/162; 427/164;
427/166; 427/167; 427/250; 427/255;
427/255.2; 427/255.3; 427/255.7; 427/404;
427/412.1; 427/419.1; 427/419.2; 427/419.7
[58] Field of Search ............... 427/162, 164, 166, 167,
427/250, 255, 255.7, 255.2, 255.3, 404, 294,
419.1, 419.2, 419.7, 412.1; 204/192.14, 192.26,
192.31, 192.27, 192.15

[56] References Cited

U.S. PATENT DOCUMENTS

| | | | |
|---|---|---|---|
| 3,218,203 | 11/1965 | Ruehrwein | 427/255.7 |
| 3,787,234 | 1/1974 | Smiley et al. | 427/255.7 |
| 3,849,129 | 11/1974 | Kinoshita et al. | 427/255.7 |
| 3,901,783 | 8/1975 | Raum et al. | 204/192.26 |
| 4,376,138 | 3/1983 | Alferness et al. | 427/162 |
| 4,635,076 | 1/1987 | Willson et al. | 427/404 |
| 4,670,356 | 6/1987 | Sato et al. | 204/192.26 |

*Primary Examiner*—Sadie Childs
*Attorney, Agent, or Firm*—Staas & Halsey

[57] ABSTRACT

An optical recording medium using a recording layer of an alloy taking two different crystalline states exhibiting different reflectivities is preferably manufactured by depositing a plurality of layers, each of which consists essentially of an element or an intermetallic compound, i.e. a material having a lower crystallizable temperature, to form a recording layer having a desired average chemical composition, while heating a substrate on which the recording layer is being deposited.

25 Claims, 4 Drawing Sheets

Fig. 7 a: PROTECTING LAYER/InSb/Sb/ZnS/SUBSTRATE
b: PROTECTING LAYER/Sb/InSb/ZnS/SUBSTRATE
c: PROTECTING LAYER/In-Sb/ZnS/SUBSTRATE

PROCESS FOR MANUFACTURING AN OPTICAL RECORDING MEDIUM

BACKGROUND OF THE INVENTION

1. Field of the Invention

The present invention relates to a process for manufacturing an optical recording medium which optically records digital information, including a write-once optical recording medium on which a user can write information only once, and an erasable optical recording medium on which information can be repeatedly written and erased.

2. Description of the Related Art

The present inventors have already disclosed optical recording mediums using a recording layer which takes two stable crystalline states exhibiting different optical characteristics transformed by an irradiation of light pulses having different powers and irradiation times in Japanese Unexamined Patent Publication (JUPP) (Kokai) No. 61-134944 published on June 23, 1986; JUPP No. 61-168145 published on July 29, 1986; and, JUPP No. 61-168144 published on July 29, 1986, among others. These recording mediums are provided with a recording layer having a uniform chemical composition in the direction of the layer thickness and are manufactured by depositing a layer having the chemical composition on a substrate while heating the substrate or by depositing such a layer followed by scanning tracks of the deposited layer with a laser beam, so that the deposited layer, or only the tracks of the deposited layer, are crystallized.

However, these processes are disadvantageous in that they require a long time for heating and cooling a substrate or for scanning a laser beam, and further, require a substrate having a high heat-resisting feature. Moreover, in the above processes, the reflectivities of a recording layer can not be altered over a wide range by selecting a thickness of the recording layer, since the recording layer has a uniform chemical composition.

The inventors developed another process for manufacturing such an optical recording medium, which comprises depositing a plurality of layers followed by heating the layers to form a recording layer (see Japanese Unexamined Patent Publication (Kokai) No. 62-20,154, published on Jan. 28, 1987). However, this process also requires a long manufacturing time, and has a disadvantage in that the characteristics of the resultant recording medium are inferior.

SUMMARY OF THE INVENTION

To solve the above mentioned problems, according to the present invention, a recording layer on a substrate is formed by successively depositing a combination of a plurality of layers having a lower crystallizing temperature, i.e., a layer of an element or a layer of an intermetallic compound, to obtain a required chemical composition as an average chemical composition thereof, and heating the substrate during deposition of the plurality of layers.

Thus, according to the present invention, there is provided a process for manufacturing an optical recording medium including a recording layer of an alloy, said recording layer of an alloy being crystalline and capable of taking two different crystalline states having different light reflectivities, said process comprising the steps of: preparing a substrate; and successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy.

DETAILED DESCRIPTION OF THE PREFERRED EMBODIMENTS

Regarding an optical recording medium in which information is recorded using two different stable crystalline states having different optical reflectivities, see the before mentioned Japanese Unexamined Patent Publications (Kokai) and Patent Application, the disclosures of which are incorporated herein by reference.

An optical recording layer of an alloy disclosed in the above references has a chemical composition intermediate between an intermetallic compound and an elemental metal or between two different intermetallic compounds, not a chemical composition of a single elemental metal or a single intermetallic compound, and thus the temperature for transforming the alloy having an intermediate chemical composition from an amorphous state to a crystalline state is relatively high and the heat treatment requires a relatively long time. According to the present invention, an optical recording layer is composed of layers, each of which consists essentially of an elemental metal or an intermetallic compound, and thus, in this optical recording layer, only the elemental metal and/or intermediate compound, which are relatively easily crystallized in nature, must be crystallized, allowing a lowering of a required temperature for the heat treatment and a shortening of a time for the heat treatment. As a result, even a substrate having a poor heat-resistant feature, such as a resin substrate, is not damaged by the heat treatment for crystallizing an optical recording layer, and the heat treatment can be conducted in a shorter time. Further, according to the present invention, since the substrate is heated at a temperature lower than a thermal deformation temperature of the substrate during deposition of layers of an element or an intermetallic compound, the layers are crystallized during the deposition thereof, and thus a heat treatment is unnecessary after such a deposition. Furthermore, it was deemed that the recording characteristics of an alloy layer are improved when the alloy layer is crystallized during deposition compared with those which are crystallized after deposition.

The alloy layer of a recording medium manufactured by the present invention need not have a uniform composition throughout the alloy layer, but it is sufficient if a portion thereof upon which a laser beam is irradiated during operation is fused to obtain a desired uniform composition. However, even if the alloy layer retains a structure of a laminate of layers and a desired uniform composition is made at a portion thereof by irradiating a laser beam, each of the layers of the laminate, i.e., layers essentially of an element or an intermetallic compound, must be crystalline.

When an intermetallic compound is deposited by a method such as sputtering particularly at a high deposition rate, the deposited intermetallic compound sometimes is not made crystalline but is amorphous, even if the substrate is heated during the deposition of the intermetallic compound on the substrate. However, such a deposited amorphous intermetallic compound layer is more easily crystallized by a heat treatment of the layer after deposition in comparison when a heat treatment is not operated during the deposition of the layer. Further, layers of an elemental metal and an intermetallic compound are advantageously made crystalline by the heat treatment during deposition.

In a preferred embodiment, a recording layer of an alloy of the present invention has the following average chemical composition, by number of atoms; for example;

$$(In_{1-x}Sb_x)_{1-y}M_y \text{ where } 0.4 \leq x \leq 0.8,$$

$0 \leq y \leq 0.2$, and M is one or more of the group consisting of Al, Si, P, S, Zn, Ga, Ge, As, Se, Ag, Cd, Sn, Bi, Te, and Pb;

$$(In_{1-x}As_x)_{1-y}M \text{ where } 0.2 \leq x \leq 1.0,$$

$0 \leq y \leq 0.2$ and M is one or more of the group consisting of Al, Si, P, S, Zn, Ge, Bi, Se, Ag, Cd, Sn, Sb, Te, Tl and Pb;

$$(In_{1-x}Bi_x)_{1-y}M_y \text{ where } 0.2 \leq x \leq 0.7,$$

$0 \leq y \leq 0.2$ and M is one or more of the group consisting of Al, Si, P, S, Zn, Ge, Bi, Se, Ag, Cd, Sn, Sb, Te, Tl and Pb;

$$(Ga_{1-x}Sb_x)_{1-y}M_y \text{ wherein } 0.4 \leq x \leq 0.9,$$

$0 \leq y \leq 0.2$ and M is one or more of the group consisting of Al, Si, P, S, Zn, Ge, As, Se, Ag, Cd, Sn, Tl, Te, Bi and Pb;

$$(Ga_{1-x}Bi_x)_{1-y}M_y$$

wherein $0.4 \leq x \leq 0.7$, $0 \leq y \leq 0.2$ and M is one or more of the group consisting of Al, Si, P, S, Zn, Ge, As, Se, Ag, Cd, In, Sn, Sb, Te, Tl and Pb; or $$(Tl_{1-x}Bi_x)_{1-y}M_y \text{ where } 0.5 \leq x \leq 0.8,$$

$0 \leq y \leq 0.2$ and M is one or more of the group consisting of Al, Si, P, S, Zn, Ga, Ge, As, Se, Ag, Cd, In, Sn, Sb, Te and Pb.

The total thickness of the alloy layer is preferably from 30 nm to 200 nm.

In a process according to the present invention, preferably a substrate made of a polymer mainly consisting of a polycarbonate is heated at 60° to 130° C., a substrate made of a polymer mainly consisting of an epoxy resin is heated at 60° to 120° C., a substrate made of a polymer mainly consisting of a polymethylmethacrylate is heated at 40° to 80° C., or a substrate made of glass having a light-curable polymer film on the top surface thereof is heated at 60° to 250° C., the heating being conducted during deposition.

In a process according to the present invention, a protecting layer may be provided on a recording layer on a substrate. Such a protecting layer includes a layer of plastic, a light-curable polymer, or an inorganic material, such as $TiO_2$, $GeO_2$, $SiO_2$, $SiO$, $Al_2O_3$, $ZrO_2$, ZnS, $MgF_2$, $CaF_2$, $Si_3N_4$, AlN and BN. The thickness of the protecting layer is preferably less than 1 μm. The protecting layer of an inorganic material may be formed by vacuum deposition.

Also, in a process according to the present invention, an underlying layer may be provided on the top surface of the substrate and under the recording layer to prevent damage to a plastic substrate by a laser beam. Such an underlying layer may be made of, for example, $TiO_2$, $GeO_2$, $SiO_2$, $SiO$, $Al_2O_3$, $ZrO_2$, ZnS, $MgF_2$, $CaF_2$, $Si_3N_4$, AlN or BN, deposited under vacuum. The thickness of the underlying layer is generally more than 20 nm, preferably 50 nm to 200 nm, from which a suitable thickness is selected to give a desired reflectivity of a recording medium. In this case, a substrate may be continuously heated, from the deposition of an underlying layer to the deposition of a recording layer or an alloy layer on the underlying layer, or may not be heated during the deposition of an underlying layer before heat treatment of the substrate during the deposition of a recording layer.

When a layer of an element (e.g. Sb) and a layer of an intermetallic compound (e.g. InSb) are to be deposited onto a substrate or onto an underlying layer on the substrate, either the element layer or the intermetallic compound layer may be first deposited. When a layer of, for example, $(In_{1-x}Sb_x)_{1-y}Se_y$ where $0.5 \leq x \leq 0.7$, $0 \leq y \leq 0.2$ is to be formed, a layer of Sb and a layer of InSb are alternately deposited and Se may be incorporated in either or both of the layers or may be inserted, as a layer of Se, between the layers of Sb and InSb.

When Se is incorporated in a layer of Sb or InSb, the layer of Sb or InSb containing Se does not consist of an element or an intermetallic compound, but the advantages of a laminated structure are not lost, since the amount of Se is small. This is applicable to all M in the before-mentioned formulae.

EXAMPLE 1

Figure 1:
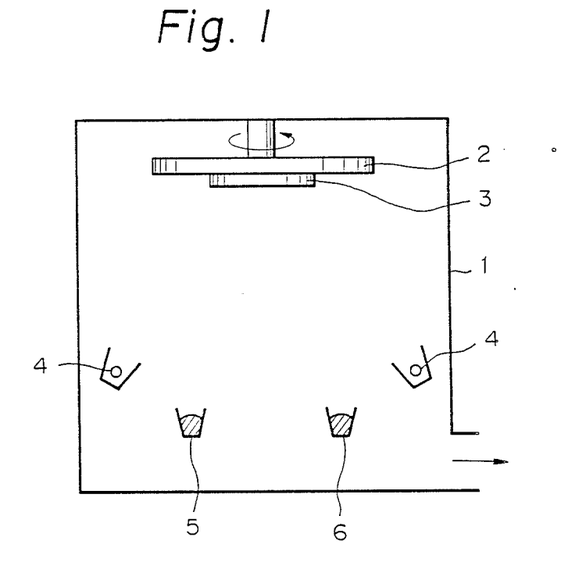
FIG. 1 is a schematical view of a system for evaporating an alloy layer.

FIG. 1 shows a system of evaporation to form an alloy layer according to the present invention, in which reference numeral 1 denotes a vacuum chamber, 2 is a substrate holder, 3 is a substrate, 4 is a lamp to heat the substrate, 5 is an In source, and 6 is an Sb source.

In a system as shown in FIG. 1, a substrate of a polycarbonate prepared by injection molding to have a pregroove was set on a substrate holder, rotated at 50 rpm, and heated to 70° C. Then ZnS was evaporated onto the substrate to form an underlying layer having a thickness of 150 nm, and the Sb was evaporated onto the ZnS layer to form an Sb layer having a thickness of 10 nm. Then, In and Sb were simultaneously evaporated from separate sources in a ratio of 1:1 by number of atoms to form an intermetallic compound InSb layer having a thickness of 60 nm. Thus obtained layers had an average chemical composition of $In_4Sb_6$. The temperature of the substrate was kept at 70° C. during the evaporation.

Thus, disc No. 1 was obtained.

Similar to the above, disc No. 2 was prepared by successive evaporation of ZnS, Sb and InSb at room temperature (25° C.) but the substrate was not heated during the evaporation. Then, the disc No. 2 was heated in a thermostat at 70° C. for 2 hours.

Similar to the above, disc No. 3 was prepared by successive evaporation of ZnS, Sb and InSb at room temperature (25° C.) but a heat treatment was not applied.

Figure 2:
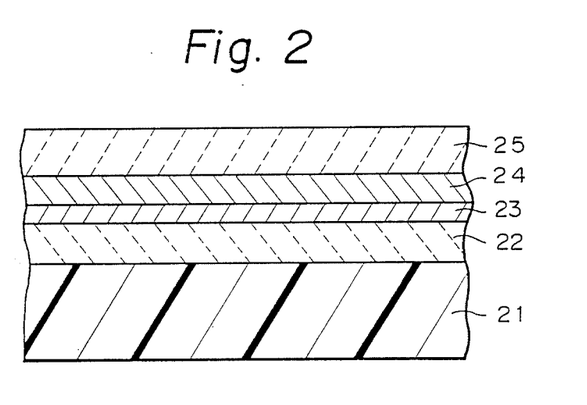
FIG. 2 is a sectional view of an optical recording medium according to the present invention.

The disc Nos. 1, 2, and 3 were coated with a UV-curable resin and irradiated with UV to cure the resin to form a protecting layer having a thickness of 20 μm. The thus-obtained disc Nos. 1, 2, and 3 are illustrated in FIG. 2, in which reference numeral 21 denotes the polycarbonate substrate, 22 the ZnS underlying layer, 23 the Sb layer, 24 the InSb layer, and 25 the UV-cured resin protecting layer. Note the layers 23 and 24 may be a layer having a single phase, respectively.

It was confirmed by X-ray diffraction that the layers 23 and 24 of Sb and InSb were crystalline. Generally, a layer of an alloy having a uniform chemical composition is crystallized by heat treatment at about 150° C. but a laminate of layers of an element or an intermetallic compound, may be crystallized at a temperature below 100° C.

Figure 3:
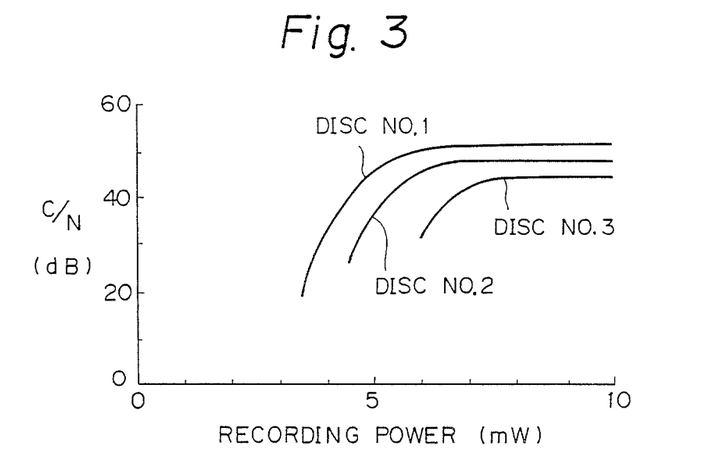
FIG. 3 shows a relationship between a CN ratio (carrier to noise ratio) of a recording medium and a recording power.

The discs 1, 2, and 3 were rotated at a linear velocity of 6 m/s, a laser beam having a beam spot diameter of 1 μm was used at various powers to record and read information at 3 MHz with a bit length of 1 μm, and a CN ratio (carrier to noise ratio) was determined in relation to the power of the laser. The results are shown in FIG. 3. From FIG. 3, it can be seen that the disc No. 1, which was prepared by evaporation while heating, has characteristics superior to those of the disc No. 2, which was prepared by evaporation at room temperature followed by heat treatment, and disc No. 3 which was prepared by evaporation at room temperature without a following heat treatment.

Figure 4:
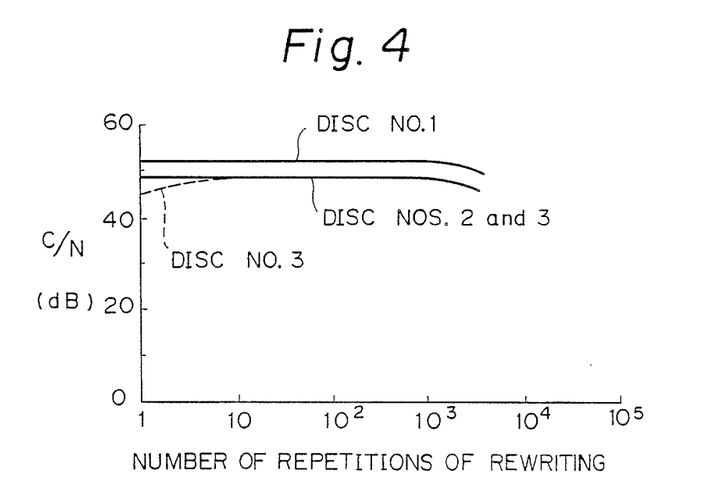
FIG. 4 shows a relationship between a CN ratio of a recording medium and a number of repetitions of writing and erasing.

Then a laser beam having a beam width of 1 μm and a beam length of 5 μm with a power of 10 mW was irradiated on a recorded track of the discs, and thus the information was erased. Then, new information was recorded on that track and read to give a CN ratio similar to the first ratio. These recording and erasing operations were repeated and changes of the CN ratio were checked. The results are shown in FIG. 4. It is seen from FIG. 4 that the CN ratio of disc No. 3, which was prepared by evaporation at room temperature without a post heat treatment, was changed (increased) at the beginning of the repetition, while those of disc No. 2, which was prepared by evaporation at room temperature followed by a post heat treatment, and disc No. 1, which was prepared by evaporation while heating, were not changed at the beginning of the repetition. The disc No. 1, which was prepared by evaporation while heating, has superior CN ratio in comparison with those of discs Nos. 2 and 3, which were prepared by evaporation at room temperature.

From the above, it is deemed that heat treatment of a substrate during evaporation of a recording layer has advantageous effects on the characteristics of a recording disc. Further, a time of 1 hour was needed to prepare disc Nos. 1 and 3, and a time of 3 hours was needed to prepare the disc No. 2, including the heat treatment after evaporation. Thus, the present invention has an advantage in that the time for preparation of a disc is shortened.

EXAMPLE 2

In the same procedure as in Example 1, a disc similar to disc No. 1 of Example 1 was prepared except that evaporation was replaced by sputtering and ion plating respectively. The resultant discs had a dependency of the CN ratio on a laser power and a dependency of the CN ratio on the repeated recording and erasing similar to those of disc No. 1 of FIGS. 3 and 4.

In the sputtering, however, when the deposition rate was increased to a certain degree, the resultant InSb layer became amorphous while the Sb layer was still crystalline. In such a case, a laser beam annealing was preferably carried out to make the InSb layer crystalline before an actual operation of the disc. Note, this laser beam annealing, however, is simpler and shorter in comparison with a laser beam annealing necessitated after an alloy of InSb and Sb having a uniform chemical composition was sputtered at room temperature.

EXAMPLE 3

In place of the polycarbonate substrate of Example 1, an epoxy resin substrate, an acrylic resin substrate, and a glass substrate having a surface UV-cured resin film, were used to prepare a disc under the same procedures as in Example 1.

The resultant discs had a dependency of the CN ratio on a laser power and a dependency of the CN ratio on repeated recording and erasing similar to those of the disc No. 1 shown in FIGS. 3 and 4.

EXAMPLE 4

The procedures of preparing the disc No. 1 of the Example 1 were repeated to prepare discs, except that (1) As and InAs were successively evaporated to form a recording layer having an average chemical composition of $In_3As_7$, (2) In and $In_2B$ were successively evaporated to form a recording layer having an average chemical composition of $In_7Bi_3$, (3) Sb and GaSb were successively evaporated to form a recording layer having an average chemical composition of $Ga_3Sb_7$, and (4) Bi and $TlBi_2$ were evaporated to form a recording layer having an average chemical composition of $Tl_{25}Bi_{75}$, respectively, instead of Sb and InSb being evaporated to form a recording layer having an average chemical composition of $In_4Sb_6$.

The resultant disc had a CN ratio of 48 dB at a linear velocity of the disc of 6 m/s, an recording signal frequency of 3 MHz, and a laser power of 10 mW, respectively.

EXAMPLE 5

Figure 5:
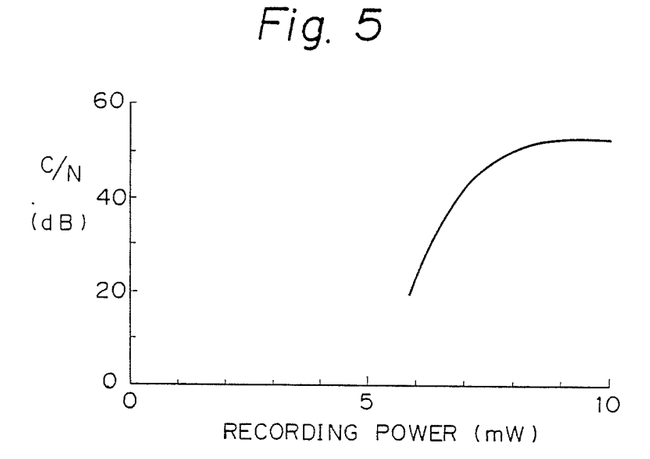
FIG. 5 shows a relationship between a CN ratio of a recording medium and a recording power.

The procedures of preparing the disc No. 1 of Example 1 were repeated, except that $SiO_2$, SiO, $TiO_2$, $GeO_2$, $Al_2O_3$, $ZnO_2$, ZnS, $MgF_2$, $CaF_2$, $Si_3N_4$, AlN and BN were evaporated to form a protecting layer having a thickness of 100 nm on the recording layer, in place of a UV-cured resin protecting layer. The typical CN ratios of the resultant discs in relation to the laser power are shown in FIG. 5. The dependencies of the CN ratio of the discs on repeated recording and erasing were similar to those of the disc No. 1 in FIG. 4.

EXAMPLE 6

The procedures of preparing the disc No. 1 of Example 1 were repeated, except that $TiO_2$, $GeO_2$, $SiO_2$, SiO, $Al_2O_3$, $ZrO_2$, $MgF_2$, $CaF_2$, $Si_3N_4$, AlN and BN were used to form an underlying layer.

The resultant discs had a dependency of the CN ratio on the laser power and a dependency of the CN ratio on repeated recording and erasing similar to those of the disc No. 1 shown in FIGS. 3 and 4.

EXAMPLE 7

The procedures of preparing the disc No. 1 of Example 1 were repeated, except that Sb and Se were co-evaporated to form an Sb layer containing 5% by atom of Se based on the total atoms of In, Sb and Se, in place of a pure Sb layer, and a disc No. 4 was obtained.

The disc No. 4 had a dependency of the CN ratio on the laser power and a dependency of the CN ratio on repeated recording and erasing similar to those of the disc No. 1 shown in FIGS. 3 and 4.

Figure 6:
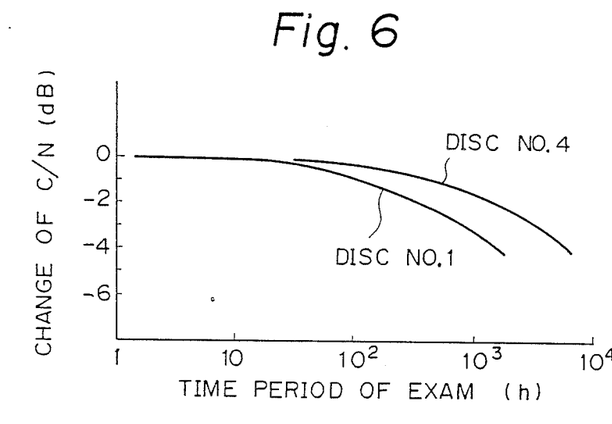
FIG. 6 shows a change of a CN ratio of a recording medium at 85° C. in accordance with a time.

The discs No. 1 and No. 4 were placed in a thermostat kept at 85° C. after recording and the change of the CN ratio of the discs were checked. The results are shown in FIG. 6. While it is known that addition of Se into an $In_4Sb_6$ recording medium will improve the lifetime of the storage of information (1987 Spring Conference of Applied Physics Society, Optical Recording, 28a-ZL-1), a similar effect of an addition of Se in a disc prepared by a process according to the present invention was confirmed.

EXAMPLE 8

The procedures of preparing the disc No. 4 of Example 7 were repeated, except that Se was added to an InSb layer instead of an Sb layer.

The resultant disc had a dependency of the CN ratio on the laser power similar to that of the disc No. 1 shown in FIG. 3, a dependency of the CN ratio on repeated recording and erasing similar to that of the disc No. 1 shown in FIG. 4, and a change of the CN ratio depending on the lapsed time similar to that of the disc No. 4 shown in FIG. 6.

EXAMPLE 9

The procedures of preparing the disc No. 4 of Example 7 were repeated, except that a 5 nm thick Se layer was inserted between the InSb layer and the Sb layer instead of adding Se to the Sb layer.

The resultant disc had a dependency of the CN ratio on the laser power similar to that of the disc No. 1 shown in FIG. 3, a dependency of the CN ratio on repeated recording and erasing similar to that of the disc No. 1 shown in FIG. 4, and a change of the CN ratio depending on the lapsed time similar to that of the disc No. 4 shown in FIG. 6.

EXAMPLE 10

The procedures of preparing the disc No. 1 in Example 1 were repeated, except that the thickness of the InSb layer was changed to prepare six discs having various thicknesses of the recording layer. Those layers have chemical composition of $In_4Sb_6$. Then the reflectivities of the discs were measured. The results are shown as the line a in FIG. 7.

Discs having various thicknesses of an InSb layer were prepared in a similar manner to that above, but the InSb layer (20 to 95 nm) was first evaporated followed by depositing an Sb layer (5 nm) thereon. The measured reflectivities of the discs are shown as the line b in FIG. 7.

Discs similar to the above but having a layer with a uniform chemical composition of $In_4Sb_6$ were prepared with a thickness varying from 20 to 100 nm. The reflectivities of the discs are shown as the line c in FIG. 7.

Figure 7:
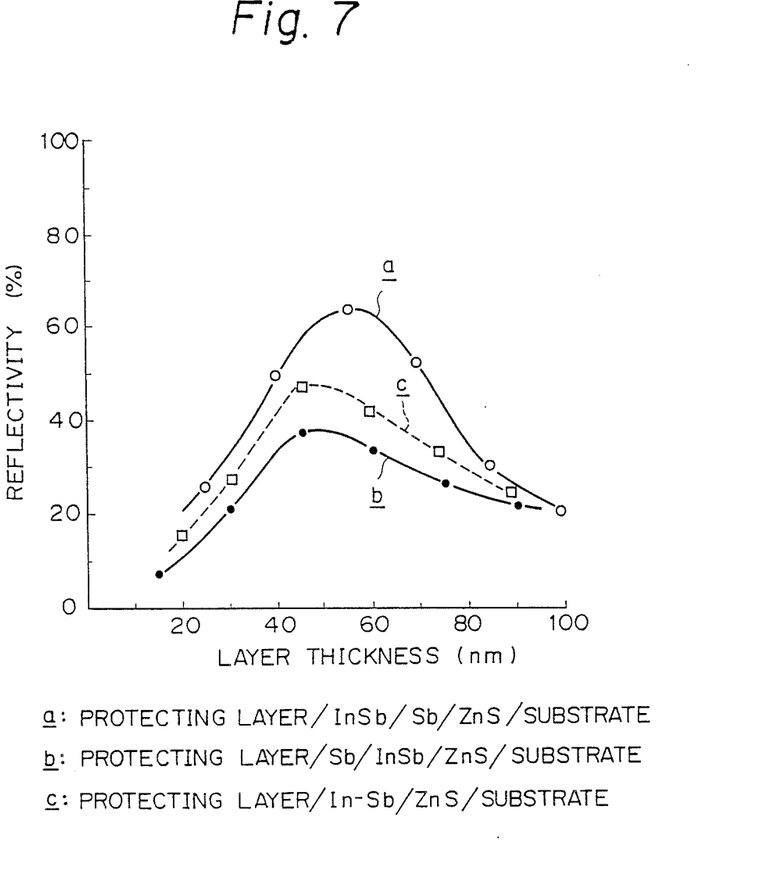
FIG. 7 shows reflectivities at a flat portion of discs.

From FIG. 7, it is seen that a disc having layers of a laminated structure has a wider range of reflectivity, as shown by the lines a and b, than a disc having a single layer having a uniform chemical composition, as shown as the line c, if they have the same average chemical composition.

As understood from the above description and examples, according to the present invention, a temperature for crystallizing a recording layer of an alloy may be lowered so that such a recording layer may be formed on a plastic substrate susceptible to heat; a time for preparing a disc may be shortened, since a heat treatment after deposition of a recording layer is eliminated; and an excellent crystallized recording layer of an alloy can be obtained so that the characteristics of the recording medium are improved. Further, a range of the reflectivity of a recording medium can be widened in comparison with a disc having a single recording layer of an alloy having a uniform chemical composition.

We claim:

1. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy of $(In_{1-x}Sb_x)_{1-y}M_y$, $0.4 \leq x \leq 0.8$, $0 \leq y \leq 0.2$, $(In_{1-x}As_x)_{1-y}M_y$, $0.2 \leq x \leq 1.0$, $0 \leq y \leq 0.2$, $(In_{1-x}Bi_x)_{1-y}M$, $0.2 \leq x \leq 0.7$, $0 \leq y \leq 0.2$, $(Ga_{1-x}Sb_x)_{1-y}M_y$, $0.4 \leq x \leq 0.9$, $0 \leq y \leq 0.2$, $(Ga_{1-x}Bi_x)_{1-y}M_y$, $0.4 \leq x \leq 0.7$, $0 \leq y \leq 0.2$ or $(Tl_{1-x}Bi_x)_{1-y}M_y$, $0.5 \leq x \leq 0.8$, $0 \leq y \leq 0.2$, and wherein, M is one or more of the group consisting of Al, Si, P, S, Zn, Ga, Ge, As, Se, Ag, Cd, In, Sn, Sb, Te and Pb.

2. A process for manufacturing an optical recording medium including a recording layer of an alloy, said recording layer of an alloy being crystalline, said process comprising the steps of:

preparing a substrate; and forming said recording layer by successively depositing a plurality of layers of the substrate while heating the substrate at a temperature lower than the thermal deformation temperature of the substrate, at least one of said successively deposited layers consisting essentially of an element composing said alloy or chemical compound of two or more elements composing said alloy, said successively deposited layers having an average chemical composition of said alloy, wherein said successively deposited layers have an average chemical composition of $(In_{1-x}Sb_x)_{1-y}M_7$ wherein $0.4 \leq x \leq 0.8$, $0 \leq y \leq 0.2$, and M is one or more of the group consisting of Al, Si, P, S, Zn, Ga, Ge, As, Se, Ag, Cd, Sn, Bi, Te, Tl and Pb.

3. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or chemical compound of two or more elements composing said alloy, said successively deposited layers having an average chemical composition of said alloy, wherein said successively deposited layers have an average chemical composition of $(In_{1-x}As_x)_{1-y}M_y$ wherein $0.2 \leq x \leq 1.0$, $0 \leq y \leq 0.2$, and M is one or more of the group consisting of Al, Si, P, S, Zn, Ge, Bi, Se, Ag, Cd, Sn, Sb, Te, Tl and Pb.

4. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said successively deposited layers have an average chemical composition of $(In_{1-x}Bi_x)_{1-y}M$ wherein $0.2 \leq x \leq 0.7$, $0 \leq y \leq 0.2$, and M is one or more of the group consisting of Al, Si, P, S, Zn, Ga, Ge, As, Se, Ag, Cd, Sn, Sb, Te, Tl and Pb.

5. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said successively deposited layer have an average chemical composition of $(Ga_{1-x}Sb_x)_{1-y}M_y$ wherein $0.4 \leq x \leq 0.9$, $0 \leq y \leq 0.2$, and M is one or more of the group consisting of Al, Si, P, S, Zn, Ge, As, Se, Ag, Cd, Sn, Tl, Te, Bi and Pb.

6. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said successively deposited layers have an average chemical composition of $(Ga_{1-x}Bi_x)_{1-y}M_y$ wherein $0.4 \leq x \leq 0.7$, $0 \leq y \leq 0.2$, and M is one or more of the group consisting of Al, Si, P, S, Zn, Ge, As, Se, Ag, Cd, In, Sn, Sb, Te, Tl and Pb.

7. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said successively deposited layers have an average chemical composition of $(Ti_{1-x}Bi_x)_{1-y}M_y$ wherein $0.5 \leq x \leq 0.8$, $0 \leq y \leq 0.2$, and M is one or more of the group consisting of Al, Si, P, S, Zn, Ge, As, Se, Ag, Cd, Sn, Tl, Te, Bi and Pb.

8. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said substrate is made of a polymer mainly consisting of a polycarbonate and said temperature for heating said substrate is from 60° C. to 130° C.

9. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said substrate is made of a polymer mainly consisting of an epoxy resin and said temperature for heating said substrate is from 60° C. to 120° C.

10. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said substrate is made of a polymer mainly consisting of a polymethylmethacrylate and said temperature for heating said substrate is from 40° C. to 80° C.

11. A process for manufacturing an optical recording medium including a recording layer of an alloy, said recording layer of an alloy being crystalline, said process comprising the steps of:

preparing a substrate; and forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy, wherein said substrate is made of glass, having a surface layer of a light-cured polymer on which said temperature for heating said substrate is from 60° C. to 250° C.

12. A process for manufacturing an optical recording medium including a recording layer of an alloy, said recording layer of an alloy being crystalline, said process comprising the steps of:

preparing a substrate;

forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy; and forming a protecting layer of a plastic on said recording layer of an alloy.

13. A process for manufacturing an optical recording medium including a recording layer of an alloy, said recording layer of an alloy being crystalline, said process comprising the steps of:

preparing a substrate;

forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy; and forming a protecting layer of a light-cured polymer on said recording layer of an alloy.

14. A process for manufacturing an optical recording medium including a recording layer of an alloy, said recording layer of an alloy being crystalline, said process comprising the steps of:

preparing a substrate;

forming said recording layer by successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy; and forming a protecting layer of an inorganic layer on said recording layer of an alloy by vacuum deposition.

15. A process according to claim 14, wherein said inorganic layer is made of one element selected from the group consisting of $TiO_2$, $GeO_2$, $SiO_2$, $SiO$, $Al_2O_3$, $ZrO_2$, $ZnS$, $MgF_2$, $CaF_2$, $Si_3N_4$, $AlN$ and $BN$.

16. A process for manufacturing an optical recording medium including a recording layer of an alloy, said recording layer of an alloy being crystalline, said process comprising the steps of:

preparing a substrate;

forming a layer having a thickness of more than 20 nm above said substrate and underlying said recording layer of an alloy; and forming said recording layer by successively depositing a plurality of layer on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy.

17. A process according to claim 11, wherein said underlying layer is made of one element selected from the group consisting of $TiO_2$, $GeO_2$, $SiO_2$, $SiO$, $Al_2O_3$, $ZrO_2$, $ZnS$, $MgF_2$, $CaF_2$, $Si_3N_4$, $AlN$ and $BN$.

18. A process according to claim 16, wherein said underlying layer has a thickness of 50 nm to 200 nm.

19. A process according to claim 16, wherein said formation of said underlying layer is carried out by vacuum deposition while heating said substrate.

20. A process according to claim 16, wherein said formation of said underlying layer is carried out by vacuum deposition without heating said substrate.

21. A process for manufacturing an optical recording medium including a recording layer of an alloy, said recording layer of an alloy being crystalline, said process comprising the steps of:

preparing a substrate;
successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy; and
heating said recording layer of an alloy deposited on said substrate.

22. A process for manufacturing an optical recording medium including a recording layer of an alloy, said recording layer of an alloy being crystalline, said process comprising the steps of:
preparing a substrate; and
successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy,
wherein said step of successively depositing a plurality of layers comprises the substeps of:
first depositing a layer of an element Sb on said substrate while heating said substrate at a temperature lower than thermal deformation temperature of said substrate; and
then depositing a layer of an intermetallic compound of InSb on said layer of Sb, an average chemical composition of said layers of Sb and InSb being 50% to 70% by atom number of Sb and the remainder of In, while heating said substrate at said temperature.

23. A process for manufacturing an optical recording medium including a recording layer of an alloy, said recording layer of an alloy being crystalline, said process comprising the steps of:
preparing a substrate; and
successively depositing a plurality of layers on the substrate while heating the substrate at a temperature lower than the thermal deformation temperature of the substrate, at least one of said successively deposited layers consisting essentially of an element composing said alloy or a chemical compound of two or more elements composing said alloy, said successively deposited layers having an average chemical composition of said alloy,
wherein said step of successively depositing a plurality of layers comprises the substeps of:
first depositing a layer of an intermetallic compound of InSb on said substrate while heating said substrate at a temperature lower than a thermal deformation temperature of said substrate; and
then depositing a layer of an element of Sb on said layer of InSb, an average chemical composition of said layers of InSb and Sb being 50% to 70% by atom number of Sb and the remainder of In, while heating said substrate at said temperature.

24. A process according to claim 22, further comprising the steps of depositing a layer of an element of Se between said layers of Sb and InSb while heating said substrate at said temperature.

25. A process according to claim 23, further comprising the step of depositing a layer of an element of Se between said layers of InSb and Sb while heating said substrate at said temperature.

* * * * *

UNITED STATES PATENT AND TRADEMARK OFFICE
CERTIFICATE OF CORRECTION

PATENT NO. : 4,889,746
DATED : December 26, 1989
INVENTOR(S) : KENICHI UTSUMI ET AL.

It is certified that error appears in the above-identified patent and that said Letters Patent is hereby corrected as shown below:

Col. 3, line 44, after "Zn," insert --Ga--, and change "Bi" to --As--.

Col. 7, line 62, "a" should be --$\underline{a}$--;
line 67, "b" should be --$\underline{b}$--.

Col. 8, line 4, "c" should be --$\underline{c}$--;
line 7, "a and b" should be --$\underline{a}$ and $\underline{b}$--;
line 9, "c" should be --$\underline{c}$--.

Signed and Sealed this

Twenty-fifth Day of May, 1993

Attest:

MICHAEL K. KIRK

Attesting Officer     Acting Commissioner of Patents and Trademarks